[19] United States Patent
Lindner

[15] 3,668,503
[45] June 6, 1972

[54] COARSE-FINE DIGITAL SERVO INDICATOR WITH CONTINUOUS ROTATION POTENTIOMETER FEEDBACK IN FINE MODE

[72] Inventor: Norman J. Lindner, New York, N.Y.
[73] Assignee: Kollsman Instrument Corporation, Syosset, N.Y.
[22] Filed: Nov. 26, 1969
[21] Appl. No.: 879,985

[52] U.S. Cl. .............................. 318/665, 318/594, 318/604
[51] Int. Cl. ........................................................ G05b 1/06
[58] Field of Search ................................. 318/594, 665, 604

[56] References Cited

UNITED STATES PATENTS

| | | | |
|---|---|---|---|
| 2,630,481 | 3/1953 | Johnson | 318/20.260 X |
| 2,827,602 | 3/1958 | Horstfall, Jr. et al. | 318/20.260 X |
| 2,861,233 | 11/1958 | McKeown | 318/20.748 |
| 2,864,044 | 12/1958 | Pardee, Jr. | 318/20.748 UX |
| 3,196,429 | 7/1965 | Gross et al. | 318/20.748 X |
| 3,254,283 | 5/1966 | Hunt | 318/20.748 |

Primary Examiner—T. E. Lynch
Attorney—E. Manning Giles, J. Patrick Cagney and Peter S. Lucyshyn

[57] ABSTRACT

This disclosure deals with a mechanical servo system used to provide accurate digital readout from binary-coded decimal input. The input data is divided into a coarse portion and a fine portion. The coarse feedback portion measures in units of 1,000 feet, while the fine feedback control measures the low order units and consists of two cyclical elements. Each fine element has occasion to pass through a dead band region, but the elements are connected in a ganged relation 180° out of phase, so that when one is at its dead band, the other is at its continuous portion. The selection of a fine feedback element is controlled through a switching circuit and according to a logic equation stored in the input unit.

9 Claims, 4 Drawing Figures

PATENTED JUN 6 1972
3,668,503
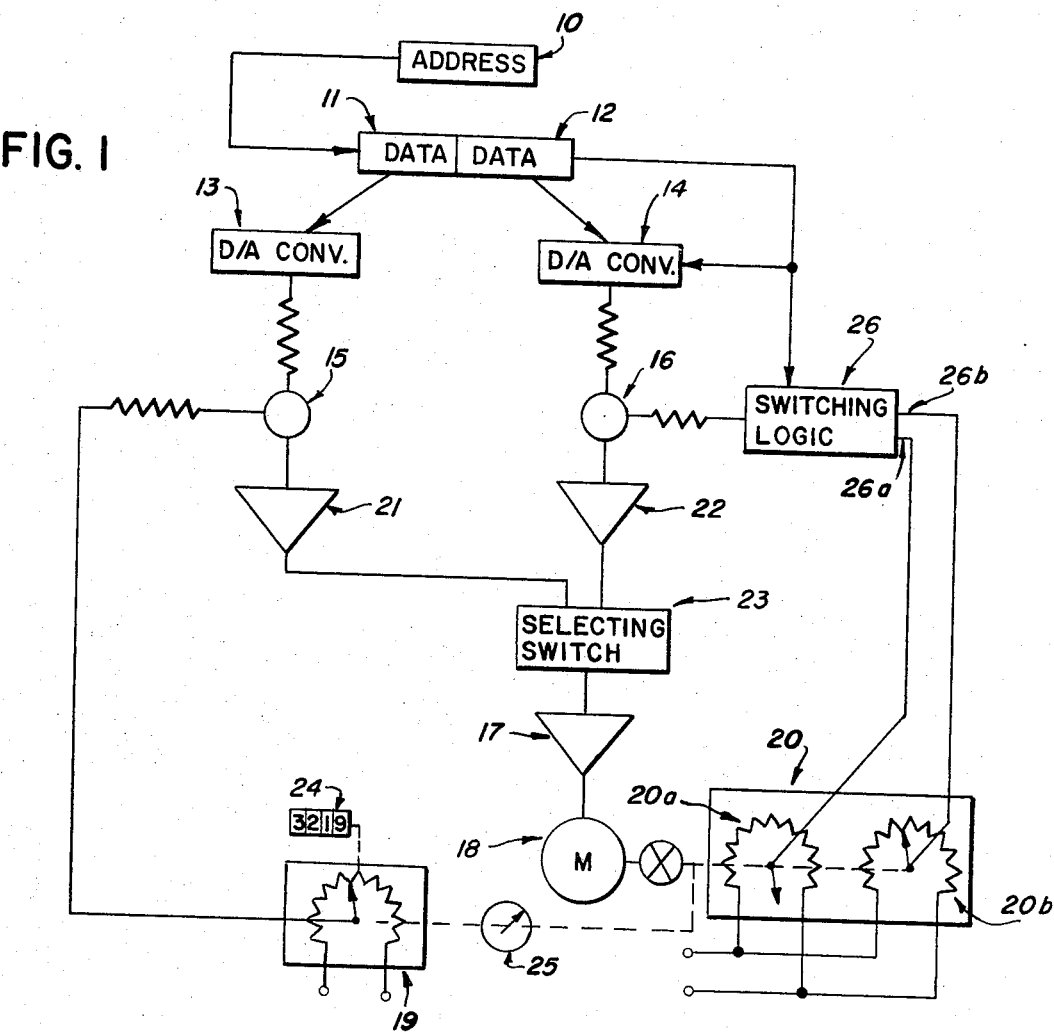
FIG. 1
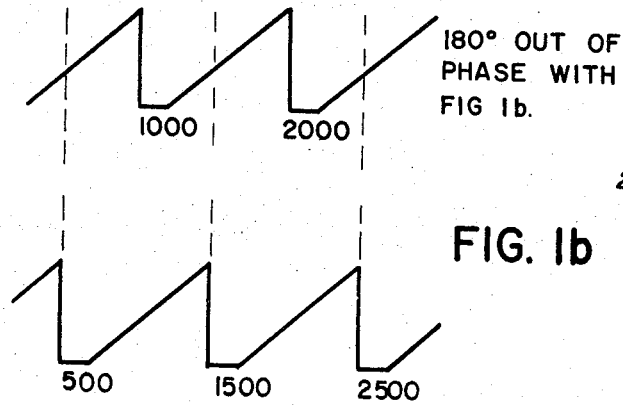
FIG. 1a
180° OUT OF PHASE WITH FIG 1b.
FIG. 1b
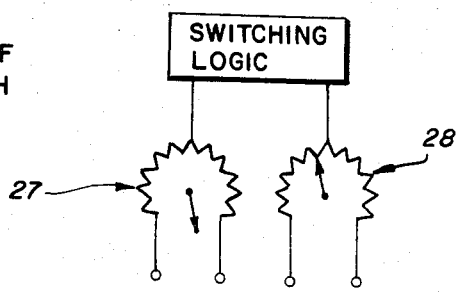
FIG. 2
INVENTOR
NORMAN J. LINDNER
BY
*J. Patrick Coyney*
ATTORNEY

COARSE-FINE DIGITAL SERVO INDICATOR WITH CONTINUOUS ROTATION POTENTIOMETER FEEDBACK IN FINE MODE

BACKGROUND OF THE INVENTION

This invention relates to digital indicator readout systems and provides a method and apparatus for generating an analogue output quantity with high accuracy from linear input data. More particularly, the invention is concerned with an input data function characterized by a discontinuity and it is desired to achieve high accuracy from a relatively inaccurate feedback element.

The invention has application with numerous instrument systems that are to be driven by a digital input signal such, for example, as altitude indicators, mach airspeed indicators, rate of climb indicators, TAS indicators, SAT indicators, BDHI's, engine pressure ratio indicators, and related engine instrumentation and similar devices.

In the case of altitude indicators, it is desired to provide a digital display or readout from binary coded decimal digital input by the use of a mechanical servo system. For such an indicator, there is a requirement for high accuracy in the tracking action of the feedback portion of the servo loop. Typically, where a 2 foot accuracy and altitude is specified over a total range of 50,000 feet, the required accuracy is 0.004 percent. A direct approach to the problem would be to utilize a custom designed feedback element having a uniformly accurate linear track such as a multiturn potentiometer, however, the cost for such a device for the range of accuracy involved is prohibitive.

SUMMARY OF THE INVENTION

In accordance with the present invention, the input data is divided into a coarse portion which, for example, measures in units of 1,000 feet and a fine portion which in this example measures from 0 to 999 feet. Thus, the feedback path of the servo loop includes one speed system for controlling response to the coarse portion of the data, that is, for positioning the servo within 1,000 feet of the required value, and a second speed system for controlling the response to the fine portion of the input. Thus the coarse response is first effective to position the servo within 1,000 feet of the required value and then the fine response is switched into operation to provide the desired exact value.

Where the input data undergoes a progressive increase, for example, where the altitude increases progressively say from 5,000 to 10,000 feet, the fine portion of the data generates a cyclical pattern beginning at 0 and moving to 999, then abruptly changing to 0 and so on, such that the fine portion of the data is seen to undergo abrupt discontinuities each time there is a shift in the 1,000 digit which is, of course, controlled by the coarse data speed system. To achieve high accuracy, a linear feedback element can be cycled to develop a repeating track so that the feedback element executes one complete traverse as the data advances from 5,000 to 5,999 and completes a second identical traverse as the data moves from 6,000 to 6,999 and so on. Any such type of repeating linear feedback element, such as resistance potentiometers, induction potentiometers, or ladder networks, can readily provide the desired accuracy. For example, where 2 foot accuracy in altitude is required, the effective range is only 1,000 feet so that the required accuracy becomes only 0.2 percent a value which can readily be satisfied with available linear potentiometers. Any such repeating linear feedback device has a dead band as required to accommodate the transition at the discontinuity points in the input. The effect of the dead band on the readout is highly objectionable. The present invention provides a pair of repeating linear feedback devices, each separately connected to exert its control function only when operating in an active region of its range of movement.

Other features and advantages of the invention will be apparent from the following description and claims and are illustrated in the accompanying drawings which show structure embodying preferred features of the present invention and the principles thereof, and what is now considered to be the best mode in which to apply these principles.

BRIEF DESCRIPTION OF THE DRAWINGS

In the accompanying drawings forming a part of the specification, and in which like numerals are employed to designate like parts throughout the same:

FIG. 1 shows a preferred embodiment of the invention as incorporated in an altitude indicator;

FIGS. 1A and 1B show the waveforms for each of the linear feedback devices and also their phase relationship; and FIG. 2 shows an alternative embodiment of the invention in which each feedback device is connected to its own source.

DESCRIPTION OF THE PREFERRED EMBODIMENTS

The altitude indicator is controlled from a central air data computer (CADC), not shown, which supplies input in binary coded decimal (BCD). The logic circuits for the altimeter input are conventional and are shown to include an address unit 10 and data register units 11 and 12. The data register unit 11 stores the high order digits of the altitude data (that is, the ten thousands, and the thousands) hereafter referred to as the coarse portion, to drive a coarse digital-to-analog converter 13. The data register 12 stores the low order digits of the altitude data (that is, the hundreds, the tens and the units), hereafter referred to as the fine portion, to drive a fine digital-to-analog converter 14. The coarse data converter 13 feeds a voltage signal to a summing point 15 and the fine data converter 14 feeds a voltage signal to the summing point 16.

The feedback type servo system of the altitude indicator includes a power amplifier 17 supplying a D.C. torque motor 18 having its output shaft connected to a coarse feedback control 19 and a fine feedback control 20. The difference signal developed at the summing point 15 controls a D.C. amplifier 21. The difference signal developed at the summing point 16 controls a separate D.C. amplifier 22. The output from D.C. amplifiers 21 and 22 are fed to a switching amplifier 23 which selects one or the other. The motor shaft 18 drives a counter 24 which indicates the coarse data and a pointer 25 which indicates the fine data. The coarse feedback control 19 feeds a voltage signal to the summing point 15 and the fine feedback control 20 feeds a voltage signal to the summing point 16.

When the difference between the signals at the summing point represents an altitude of more than 1,000 feet, the difference signal is used to slew the servo motor until the difference in altitude is less than 1,000 feet. The D.C. amplifier then switches to the fine control system which maintains control from this point on. If the altitude error should exceed 1,000 feet for any reason, the coarse control takes over again.

In the preferred embodiment that is illustrated herein, the coarse feedback control element 19 is a single turn linear potentiometer connected to be driven at a speed of 100,000 feet per turn so that a single rotation spans the entire altitude range. The altitude servo is a continuous rotation unit and the fine feedback control element 20 is comprised of single turn linear potentiometers 20A and 20B each connected to be driven at a speed of 1,000 feet per turn so that each undergoes a large number of rotations.

Since any single turn potentiometer has a dead band corresponding to the span of the physical gap between the opposite ends of the single turn wiper track, a discontinuity in the potentiometer output necessarily exists when the wiper traverses the gap in the track. Accordingly, the output from the potentiometer 20A, assuming unidirectional constant speed movement of the wiper, is given by the waveform of FIG. 1A. The wiper for potentiometer 20B is shown to be one-half turn out of phase with both wipers being driven in unison so that the corresponding output from its wiper is given by the waveform of FIG. 1B. The potentiometers 20A, 20B are geared at 1,000 feet per turn in the illustrated embodiment so that the wipers are 500 feet apart. The one-half turn phase difference is arbitrarily chosen to provide that the dead band regions of the potentiometers 20A, 20B do not overlap. In accordance with this invention, the feedback position signal is selected from potentiometer 20A when its wiper is at a range that does not include its dead band and is selected from potentiometer 20B when its wiper is at a range that does not include its dead band. This avoids discontinuities in the feedback signal.

The selection function is controlled through a switching logic unit 26 which has individually selectable feedback terminals 26A, 26B separately connected to the wipers of potentiometers 20A, 20B. In the illustrated arrangement, the potentiometers are connected in parallel across a common source so that the wipers are always at different voltage levels separated by a constant predetermined increment. A single potentiometer provided with two electrically isolated wipers exactly one-half turn apart would serve the same function as the two potentiometer arrangement illustrated herein.

The digital-to-analog converter can be operated in two different modes to provide analog signal output levels separated by the same constant predetermined increment. The data register is connected to synchronize the operation of the digital-to-analog converter and the switching logic unit to maintain the correct relationship between command altitude voltage and indicated position voltage. Thus, the digital-to-analog converter is switched to mode 1 operation when the wiper of potentiometer 20A is connected through the logic unit to the amplifier and is switched to mode 2 operation when the wiper of potentiometer 20B is connected through the logic unit.

In the operation of the fine control system, the selection of the particular wiper output is made by the 1,000 foot data register in accordance with the following logic equations where each integer represents the hundreds digit.

SWITCH TO POT. 20B = (POT. 20A) ° (8+9+0+1+2)

SWITCH TO POT. 20A = (POT. 20B) ° (3+4+5+6+7)

Thus, if the input is 800 feet or greater, or less than 300 feet (the hundreds digit is 8 or 9 or 0 or 1 or 2), then potentiometer 20B is selected. If the hundreds digit is 3 or 4 or 5 or 6 or 7, then potentiometer 20A is selected.

The fine digital-to-analog converter is switched simultaneously with the switching of the potentiometers 20A, 20B. If potentiometer 20A is selected, the D/A reading is the same as the number in the fine part of the data register. If potentiometer 20B is selected, then the number in the D/A converter is 500 feet from the actual reading in the fine register.

For example, when the fine register reads as indicated below, the D/A converter will be switched to predetermined signal levels representing the hundreds digit, as indicated:

Fine Register    8 9 0 1 2

D/A Converter    3 4 5 6 7

It should be noted that while the fine data has a sharp change each time it goes through the 999 to 1,000 range and while the individual potentiometers 20A, 20B present discontinuities at their individual dead band regions, switching between input data levels in synchronism with switching between the continuous regions of the wiper tracks eliminates errors and discontinuities in the altitude indication provided by the pointer. An alternative to connecting the potentiometers across a common source is shown in FIG. 2. In FIG. 2 the potentiometers 27 and 28 are each connected to their own source. This alternative eliminates the need to compensate for the value in the D/A converter.

The advantage of the altitude indicator system shown herein is that it can utilize relatively inaccurate single turn potentiometers both for the coarse data feedback potentiometer and for the ganged pair of fine data feedback potentiometers. With the present system, a 0.2 percent accurate potentiometer must span only a 1,000 foot range even though actual altitude range is 50,000 feet or more. Therefore, such a potentiometer achieves an accuracy in altitude of 2 feet. If a multiturn pot were used to span a total altitude range of 50,000 feet, an accuracy of 0.004 percent would be required to maintain an altitude accuracy of 2 feet.

The logic system may utilize other formats for controlling the pattern of switching between the potentiometers 20A, 20B. For example, the logic may be set so that for increasing altitude values, the system switches from potentiometer 20B to potentiometer 20A when the hundreds digit reaches 3 and switches back to potentiometer 20B when the hundreds digit reaches 8. Correspondingly for decreasing altitude values, the system switches from potentiometer 20B to potentiometer 20A when the hundreds digit reaches 6 and switches back to potentiometer 20B when the hundreds digit reaches 1. Such a system will have the D/A unit switched in the same sequence. There is advantage in this format where the input altitude values fluctuate about a hundreds digit that serves as a switching point. For example, if the altitude varies between the 7 and 9 hundreds digits, potentiometer 20B, once selected, will remain selected. Thus, from the examples it will be apparent to one skilled in the art that the switching logic causes the switching point or operating point to be switched simultaneously with the switching of the potentiometers for preventing transients due to fluctuations of the input altitude values. In the example given, each switching or operating point may be observed to be at a value for which both potentiometers are at continuous regions, and in addition it will be seen that the switching or operating points are spaced apart sufficiently to prevent transients for the assumed fluctuation between the 7 and 9 hundreds digits.

Thus, while preferred constructional features of the invention are embodied in the structure illustrated herein, it is to be understood that changes and variations may be made by those skilled in the art without departing from the spirit and scope of the appended claims.

The embodiments of the invention in which an exclusive privilege or property is claimed are defined as follows:

1. Linear control apparatus for positioning a controlled element in accordance with a single input signal, said apparatus including a servo loop having a motor, a controlled element positioned by said motor, a single summing point to receive said input signal, feedback means movable with the controlled element to supply to said summing point a feedback signal correlated in predetermined relation to the input signal in accordance with the position of the controlled element, and an amplifier connected to said summing point and responsive to said input signal and said feedback signal to produce an output signal which controls the response of the motor, the improvement wherein said feedback means comprises;

first and second signal dividing means each having an electrical path comprised of a continuous portion and a discontinuous portion and movable in ganged relation with said controlled element so that when either signal dividing means is at its continuous portion;

a switching circuit connected to said first and second signal dividing means for selectively switching only one or only the other of said signal dividing means into said servo loop;

and switching logic means automatically responsive to the input signal to actuate the switching circuit at an operating point at which each of said signal dividing means is at its continuous portion, said switching logic means simultaneously switching to another operating point at which each of said signal dividing means is at its continuous portion, the last-named operating point being spaced from the first-named operating point to prevent transients due to fluctuations of the input signal.

2. Apparatus as in claim 1 wherein said switching logic means to control the switching circuit also operates to simultaneously switch the input signal to a corrected input signal with a value correlated with the value of the active feedback signal.

3. Apparatus as in claim 1 wherein said signal dividing means are voltage dividers.

4. Apparatus as in claim 3 wherein said voltage dividers are connected across a common source.

5. Apparatus as in claim 3 wherein said voltage dividers are each connected to their own source.

6. Apparatus as in claim 3 wherein said voltage dividers have a cyclical electrical path 7. Linear control apparatus for positioning a controlled element in accordance with a single linear input signal, said apparatus including a servo loop having a motor, a controlled element positioned by said motor, a single summing point to receive said input signal, feedback means movable with the controlled element to said summing point a feedback signal correlated in predetermined relation to the input signal in accordance with the position of the controlled element, and an amplifier responsive to said input signal and said feedback signal to produce an output signal which controls the response of the motor, the improvement wherein said feedback means comprises:

first and second potentiometers each having a cyclical electrical path comprised of a continuous portion and a discontinuous portion, said potentiometers connected in parallel across a common source and movable in ganged relation with said controlled element so that one potentiometer is in its continuous portion, when the other is in its discontinuous portion;

a switching circuit connected to said first and second potentiometers for selectively switching only one or only the other of said potentiometers into said servo loop;

and switching logic means automatically responsive to the input signal to actuate the switching circuit at an operating point at which each of said potentiometers is at its continuous portion, said switching logic means simultaneously switching to another operating point at which each of said potentiometers is at its continuous portion, the last-named operating point being spaced from the first-named operating point to prevent transients due to fluctuations of the input signal.

8. Control apparatus for positioning a controlled element in accordance with a linear input signal said apparatus including:

two storage units one of which stores a pre-selected high order portion of the input data, while the other stores the resulting cyclically repeating low order portion of the input data;

a first feedback loop responsive to the high order input data signal and the first feedback signal to produce a first difference signal;

a second feedback loop responsive to the low order portion of the input data and including a second feedback control means for producing a second feedback signal;

a second summing point responsive to the low order input data signal and the second feedback signal to produce a second difference signal;

said second summing point comprising the sole summing point of said second loop, a controlled element included in said second loop;

a motor drivingly connected to said element;

switching means responsive to the difference signals developed by said first and second summing points to selectively apply one of said last-named signals to control the motor;

said second feedback control has first and second signal dividing means each having a cyclical electrical path comprised of a continuous portion and a discontinuous portion and movable in ganged with said controlled element so that when either signal dividing means is at its discontinuous portion the other signal dividing means is at its continuous portion;

a switching circuit connected to said first and second signal dividing means for selectively switching only one or only the other of said signal dividing means into said second feedback loop;

and switching logic means automatically responsive to the low order portion input data to actuate the switching circuit at an operating point at which each of said signal dividing means is at its continuous portion and to simultaneously cause a corrected input signal to be generated with a value correlated with the value of the active feedback signal, said switching logic means simultaneously switching to another operating point at which each of said signal dividing means is at its continuous portion, the last-named operating point being spaced from the first-named operating point to prevent transients due to fluctuations of the low order portion input data.

9. Apparatus as in claim 8 wherein said signal dividers are potentiometers.

* * * * *